(12) United States Patent
Waschkewitz et al.

(10) Patent No.: US 11,725,762 B2
(45) Date of Patent: Aug. 15, 2023

(54) CONNECTING DEVICE FOR MEDIA LINES (71) Applicant: VOSS AUTOMOTIVE GMBH, Wipperfürth (DE)

(72) Inventors: Markus Waschkewitz, Bergneustadt (DE); Harald Hagen, Wipperfürth (DE); Adrian Klehr, Balve (DE); Frank Engelhard, Wermelskirchen (DE); Jochem-Andreas Hess, Wipperfürth (DE); Evelin Rosowski, Wipperfürth (DE); Ihab Hatoum, Kürten (DE); Markus Hasberg, Wipperfürth (DE); Michael Brombach, Lindlar (DE)

(73) Assignee: VOSS Automotive GmbH, Wipperfürth (DE)

( * ) Notice: Subject to any disclaimer, the term of this patent is extended or adjusted under 35 U.S.C. 154(b) by 397 days.

(21) Appl. No.: 17/042,818

(22) PCT Filed: Mar. 28, 2019

(86) PCT No.: PCT/EP2019/057842
§ 371 (c)(1),
(2) Date: Sep. 28, 2020

(87) PCT Pub. No.: WO2019/185783
PCT Pub. Date: Oct. 3, 2019

(65) Prior Publication Data
US 2021/0018128 A1 Jan. 21, 2021

(30) Foreign Application Priority Data
Mar. 28, 2018 (DE) ...................... 10 2018 107 507.3

(51) Int. Cl.
*F16L 37/088* (2006.01)

(52) U.S. Cl.
CPC ....... *F16L 37/0885* (2019.08); *F16L 2201/10* (2013.01)

(58) Field of Classification Search
CPC ..... F16L 37/088; F16L 37/0885; F16L 37/12; F16L 37/1225; F16L 37/14; F16L 37/142; F16L 37/144
See application file for complete search history.

(56) References Cited

U.S. PATENT DOCUMENTS

| 5,683,117 A | 11/1997 | Corbett et al. |
| 6,089,616 A | 7/2000 | Trede et al. |

(Continued)

FOREIGN PATENT DOCUMENTS

| DE | 20012524 U1 | 9/2000 |
| DE | 102016109051 A1 | 4/2017 |

(Continued)

*Primary Examiner* — Aaron M Dunwoody
(74) *Attorney, Agent, or Firm* — Honigman LLP; Eric J. Sosenko (57) ABSTRACT

A connecting device for media lines including a coupling element, an insert part and a fastening element. The coupling element has a connection opening and a fluid channel; the insert part can be inserted into the connection opening; and the insert part can be fastened to the coupling element by the fastening element. The fastening element also has at least one control surface. When the insert part is inserted into the connection opening under the action of an installation force, the insert part acts upon the control surface in such a way that the fastening element is moved against a restoring force. If the installation force is sufficient, the insert part slides past the control surface and the fastening element interlockingly locks the insertion part. If the installation force is not sufficient, the fastening element presses the insert part back out of the connection opening.

20 Claims, 10 Drawing Sheets (56) References Cited

U.S. PATENT DOCUMENTS

| | | |
|---|---|---|
| 2005/0179258 A1 | 8/2005 | Brandt et al. |
| 2008/0279621 A1 | 11/2008 | Chaupin |
| 2009/0008928 A1 | 1/2009 | Binder et al. |
| 2013/0009393 A1 | 1/2013 | Hartmann et al. |
| 2014/0197629 A1 | 7/2014 | Barthel et al. |
| 2014/0326223 A1* | 11/2014 | Proettel ............ F02M 35/10209 123/559.1 |
| 2017/0184240 A1 | 6/2017 | Cho et al. |
| 2018/0306363 A1 | 10/2018 | Oberdorfer et al. |

FOREIGN PATENT DOCUMENTS

| | | |
|---|---|---|
| EP | 2799751 A1 | 11/2014 |
| JP | 2000104877 A | 4/2000 |
| JP | 2005535845 A | 8/2005 |
| JP | 2010007700 A | 1/2010 |
| JP | 2014137141 A | 7/2014 |
| WO | 20010036810 A1 | 5/2001 |
| WO | 2011016805 A1 | 9/2011 |

\* cited by examiner

CONNECTING DEVICE FOR MEDIA LINES

BACKGROUND

The invention relates to a connecting device for media lines, with at least one coupling element, at least one insertion part and at least one attachment element, wherein the coupling element features at least one connection opening and at least one fluid channel, wherein the insertion part can be inserted at least in part into the connection opening, in particular in an axial direction which is oriented parallel to or coaxial to a middle axis of the connection opening. The insertion part can be attached to the coupling element by means of the attachment element.

Connecting devices for media lines are known in a plurality of embodiments from the prior art. In connecting devices of this kind the connection openings act for connecting of the fluid channel of the connecting device to a media line. For example, in connection openings of a coupling element, so-called press-cartridges are installed which are securely connected to the coupling element inside the connection opening, and a connecting interface is produced for a media line, for example, a recess for a connecting plug.

The term "media line" is understood basically to mean line connections for any particular flowing or compressed media, such as gases and liquids. Basically media lines are tube or hose lines and also their joining and connecting elements which are part of a system for conducting of a medium. In particular media lines of this kind are produced from plastic.

The connecting devices known from the prior art often require a large assembly expense and/or are not suitable for applying of the retaining forces necessary for pressure applications, which can result in damage to the connecting device. In addition, connecting devices known from the prior art are susceptible to incorrect assembly.

Therefore the invention is based on the problem of specifying a connecting device in which the assembly effort is reduced, with which large retaining forces can be applied and which reduces the risk of improper assembly.

SUMMARY

According to the invention this problem is solved in that the attachment element is movably held against the coupling element, in particular relative to a middle axis of the connection opening, preferably in a notional plane of motion to which the middle axis of the connection opening is a plane-normal, and that the attachment element features at least one control surface. When inserting the insertion part into the connection opening under the effect of an assembly force, the insertion part acts on the control surface such that the attachment element is moved preferably in the plane of motion out from a starting position in which the attachment element would catch an insertion part, opposite a restoring force, in particular relative to the middle axis of the connection opening.

The restoring force acting opposite the movement of the attachment element due to the insertion of the insertion part is caused by an at least partially elastic deformation of the attachment element caused in particular by the movement. In particular when the assembly force is sufficient, the insertion part slides along past the control surface, so that the attachment element is moved under the effect of the restoring force back oppositely in the direction of the initial position and snaps with the insertion part in an interlocking manner. Consequently, the attachment element is located in a starting position and due to the insertion of the insertion part is deflected temporarily into an intermediate position and subsequently moves under the effect of the restoring force back into the starting position, wherein the insertion part is locked in an interlocking manner.

The assembly force usually amounts to between 70 N and 90 N, in particular about 80 N. This assembly force ensures that the insertion part will snap reliably into the coupling element and/or the attachment element. The restoring force of the attachment element amounts to between 30 N and 60 N.

The assembly force acting essentially in parallel to the middle axis of the connection opening is then sufficient, when the restoring force is overcome at least with the portion of the assembly force acting on the control surface, until the insertion part can slide along or slide past the control surface and a movement of the attachment element is released in the opposite direction. A portion of the assembly force herein is transferred via the control surfaces onto the attachment element and produces a movement of the attachment element in a plane of motion. In turn, this movement is causal for the deformation of the attachment element, so that the restoring force is produced. The middle axis of the connection opening is a planar normal to the plane of movement of the attachment element. The assembly force in total must be great enough to generate both a displacement of the attachment element along the control surface, and also to overcome the frictional forces on the insertion part and on the attachment element, and also to overcome the deformation forces for the sealing means on the insertion part during insertion.

The assembly force and/or the duration of application of the assembly force is not sufficient when the attachment element is not moved across the control surface far enough that the insertion part can slide along or slide past the control surface. In this case the restoring force is adjusted and selected preferably so that the attachment element is moved under the effect of the restoring force back into the starting position and the insertion part is again pressed at least partly back out from the connection openings by means of the control surface.

This will ensure that any improper assembly is noticed immediately.

In any case the restoring force is selected and is preferably adjusted, for example by selection of the material of the attachment element and/or by the degree of deformation of the attachment element, so that the attachment element does not remain in a self-blocking, intermediate position. Thus the attachment element is either in the starting position and locks the insertion part, or the attachment element after a deflection is again in the starting position and has pressed the insertion part opposite the assembly direction—along the middle axis of the connection opening—back out from the connection opening.

According to a first embodiment of the connecting device, the invention provides that the attachment element features at least two control surfaces. In particular the invention provides that the control surfaces feature a slope of between 30° and 50° to the plane of motion of the attachment element. For a uniform force transmission onto the attachment element it is advantageous that two control surfaces be provided, in particular positioned side by side. Advantageously the control surfaces are of identical design and are inclined identically.

The invention also provides that the control surfaces are bulged convex or concave. In any case, the control surfaces are designed so that a force directed onto the control surfaces parallel to the middle axis of the connection opening causes a movement of the attachment element, in particular in a plane of motion which is directed orthogonal to the force.

According to an additional embodiment of the connecting device, the invention provides that the attachment element is guided into at least one recess of the coupling element. This recess at least partly surrounds the connection opening. The recess passes at least partly and/or entirely through the wall surrounding the connection opening. Advantageously for stability reasons the invention provides that the recess features at least one web, preferably between two and five webs, and that the web or webs overlap the recess in a stabilizing manner.

The web or webs prevent the wall surrounding the recess from being so greatly weakened in the region of the recess and prevent a separation of the remaining regions of the wall, in particular in a direction parallel to the middle axis of the connection opening. Advantageously the invention also provides that at least one web, in particular two webs, preferably four webs, are arranged so that due to the webs the mobility of the attachment element is limited, in particular so that the web or the webs define the location of the intermediate position. In the intermediate position the insertion part can slide along the control surfaces such that subsequently the control surfaces are no longer impacted by a force, so that the restoring force moves the attachment element into the starting position.

In particular in order to increase the retaining forces, according to another embodiment of the connecting device, it has proven advantageous that the invention provides that the attachment element features at least two, in particular at least four, preferably at least six snap-in surfaces which in the assembled state cooperate with the insertion part in an interlocking manner, in particular cooperate with an attachment collar on the insertion part.

Upon insertion of the insertion part, the snap-in surfaces are pushed with the attachment element such that the insertion part can slide past them. Then when the insertion part slides past the control surfaces and has moved deeply into the connection opening such that the attachment element is again moved into its starting position under the effect of the restoring force, then the snap-in surfaces are also moved into positions in which they cooperate in an interlocking manner with the insertion part, in particular with an attachment collar on the insertion part, and prevent any emergence of the insertion part in a direction parallel to the middle axis of the connection opening, in particular opposite the assembly direction. The snap-in surfaces are arranged preferably such that in the starting position they pass through the recess in the wall of the coupling element surrounding the connection opening.

An additional embodiment of the connecting device provides that at least one snap-in surface is formed on one lug of the attachment element, and that a control surface is also formed on this lug. Preferably the control surface is designed so as to be adjoining on the snap-in surface. Advantageously the attachment element features at least two or a plurality of lugs, and on each lug there is at least one snap-in surface and/or at least one control surface formed. Advantageously on one side of one lug there is a snap-in surface, and on an opposing side of the lug, there is a control surface. Due to a sloping of the control surface, the control surface is designed in particular bounding on the snap-in surface.

According to an additional embodiment of the connecting device, the invention provides that the attachment element is designed such that it at least partly surrounds the coupling element and thus also in the assembled state the installed insertion part, namely such that a first end region and a second end region of the attachment element are disposed opposite each other, in particular on opposing sides of the middle axis of the connection opening. In this regard it has proven advantageous when the attachment element has an essentially C-shaped cross section as seen in a top view. For example, the attachment element features two, in particular curved, legs and one, in particular curved, back connecting the legs. Consequently the attachment element extends—in a top view—along an arc with an angle of between 250° and 270°.

Because the attachment element at least partly surrounds the coupling element and is designed in particular in a C-shape, the two end regions of the attachment element are pressed away from each other during a movement from the starting position, so that the restoring force is produced, at least in part.

In this connection it has proven to be particularly advantageous when, according to an additional embodiment, at least one guide lug is provided in the first end region and/or in the second end region of the attachment element, advantageously at least two guide lugs are formed on each end region. The guide lug or the guide lugs extend in the assembled state advantageously upward and downward into both end regions, in a direction parallel to the middle axis of the connection opening.

Corresponding to the guide lugs, the coupling element features one guide surface for each guide lug and during a movement of the attachment element from the starting position, the particular guide lug slides along the guide surface. In the starting position the guide lugs rest advantageously flush against the guide surfaces. Due to the constructive arrangement and configuration of the guide lug itself and its positioning relative to the guide surfaces, the degree of elastic deformation of the attachment element can be determined after a movement in the plane of motion, proceeding from the starting position, and thus the magnitude of the restoring force can be adjusted. Advantageously the invention provides that the guide surface is oriented essentially tangential to a notional circle around the middle axis and the connection opening.

Thus the restoring force is adjustable by means of the selection of material for the attachment element, by the material thickness of the attachment element in the deformed regions and/or by the alignment of the guide lugs and the guide surfaces.

According to another embodiment, it has proven to be advantageous that the guide surfaces cooperating with the guide lugs arranged with the first end region and the second end region, in particular with the guide lugs disposed thereon, are oppositely inclined with respect to each other.

In particular to further improve the reliability of the attachment of the attachment element, according to an additional embodiment the invention provides that the attachment element, in particular at least in the first end region and/or at least in the second end region, features at least one snap-in protrusion, and that each snap-in protrusion in the assembled state engages in a snap-in setback on the insertion part, in particular that the snap-in protrusion or protrusions can move in a radial direction. Because the snap-in protrusion is disposed at the first end region and at the second end region of the attachment element, in a deformation of the leg of the attachment element caused by the movement of the attachment element, the snap-in protrusion is likewise moved outward, so that the insertion part can be installed. If the attachment element is again moved in the direction of the starting position, then the snap-in protrusions at the end regions of the attachment element are moved advantageously essentially in a radial direction along the middle axis of the connection opening and then engage in an interlocking manner into snap-in setbacks provided on the insertion part.

Preferably in order to reduce the installation space, according to another embodiment of the connecting device, the invention provides that the insertion part features at least one flat section, in particular at least two or four oppositely arranged flat sections on the outer perimeter, and that the connection opening features at least one corresponding flat section, in particular at least two or four oppositely arranged flat sections on the inner perimeter. The insertion part can be inserted into the connection opening in one alignment only in the case of one flat section and in two alignments in the case of two flat sections. This has the advantage that after assembly of the insertion part in the connection opening, any twisting of the insertion part is prevented. Furthermore, due to the flat section the design configuration allows a more compact connecting device.

An additional embodiment of the attachment element according to the invention provides that the attachment element features at least one blocking edge, in particular that the blocking edge in the assembled state cooperates in an interlocking manner with the coupling element. The blocking edge is disposed advantageously such that the blocking edge in the operating state is pushed by the pressure applied in the fluid channel into engagement with at least one edge of the coupling element. Consequently the blocking edge is pressure-activated. Furthermore, the blocking edge is arranged on the attachment element such that due to its cooperation with one edge of the coupling element, it prevents any opening of the attachment element and thus prevents an unintentional loosening of the attachment element, especially during operation. At least two, preferably at least four blocking edges are provided advantageously on the attachment element. In particular, the blocking edges are arranged oppositely on the attachment element.

In addition it has proven advantageous to provide the blocking edges on one lug of the attachment element, preferably designed as adjoining one control surface. For example, the control edge extends essentially orthogonal to one snap-in surface. A blocking edge has a height, for example, of between 0.1 mm and 0.3 mm, preferably 0.2 mm. The height of the blocking edge corresponds advantageously to the extension parallel to the middle axis A of the connection opening.

According to another embodiment, handling during the assembly of the connecting device is simplified in that the attachment element is designed and set up so that a snapping noise is produced whenever the starting position is reached. Due to the snapping noise, an assembler can detect that an insertion part installed into the connection opening has been properly seated. For example, the snapping noise can be produced by the sliding of two edges or by the contact of two surfaces, especially of the coupling element and the attachment element.

The penetration of contamination, paint or small foreign bodies between the attachment element and the coupling element is prevented according to another embodiment in that the attachment element features at least one circumferential guard edge on at least one side. The guard edge extends across a base body of the attachment element and thereby in the assembled state overlaps the gap between attachment element and coupling element. Thus any penetration of paint during painting, or of contaminants is prevented. Advantageously the attachment element features one circumferential guard edge on the opposing sides, so that both gaps between attachment element and coupling element are bridged.

Assembly of the connecting device is simplified in that the coupling element features at least one alignment indicator for the insertion part. The insertion part features at least one corresponding alignment indicator, so that an assembler will recognize that the insertion part can be brought into an alignment in which the two alignment indicators are aligned to each other. Advantageously the coupling element and the insertion part each feature two alignment indicators, so that the insertion part can be assembled in two alignments.

According to an additional embodiment of the invention, the alignment of a connecting plug installed in the coupling element can be determined in that the coupling element features at least one rotation lock, and that the rotation lock can be snapped in with the coupling element in an interlocking manner. In this regard the rotation lock is set onto the coupling element in the region of a connection opening and snaps therein in an interlocking manner. The interlocking snap-in is designed such that it can also transfer a torque around the middle axis A. The connecting plug cooperates with the rotation lock in an interlocking manner in order to specify its rotational alignment.

Additional favorable embodiments of the invention are presented in the following description of figures and in the dependent claims.

BRIEF DESCRIPTION OF THE DRAWINGS

The Figures Show.

The same parts in the various figures are always denoted by the same reference symbols.

DETAILED DESCRIPTION

With regard to the following description, the invention is not limited to the design examples and not to all or a plurality of features or described feature combinations, rather each individual part feature of the design example is also of importance to the subject matter of the invention, even detached from all other part features described in connection therewith, and also in combination with any other particular features of another design example.

Figure 1:
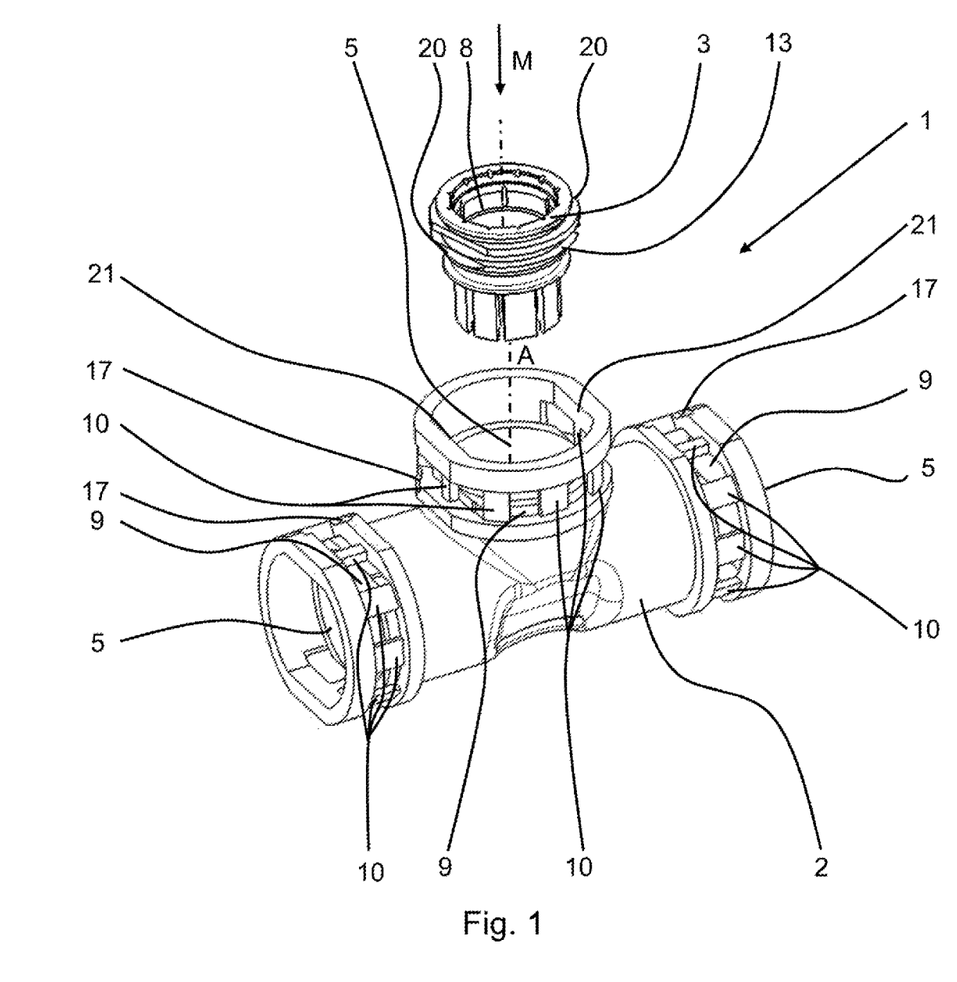
FIG. 1 an exemplary embodiment of a part a connecting body, perspective view.

FIG. 1 depicts an exemplary embodiment of a connecting device 1, perspective view. The connecting device 1 features at least one coupling element 2, which in this exemplary embodiment is designed as a T-connector. The connecting device 1 furthermore features at least one insertion part 3, and also an attachment element 4 depicted separately in FIGS. 4a to 4c. In this exemplary embodiment, the coupling element 2 features three connection openings 5 which allow the production of a connection to a fluid channel 6 denoted for example in FIG. 2.

Figure 4A:
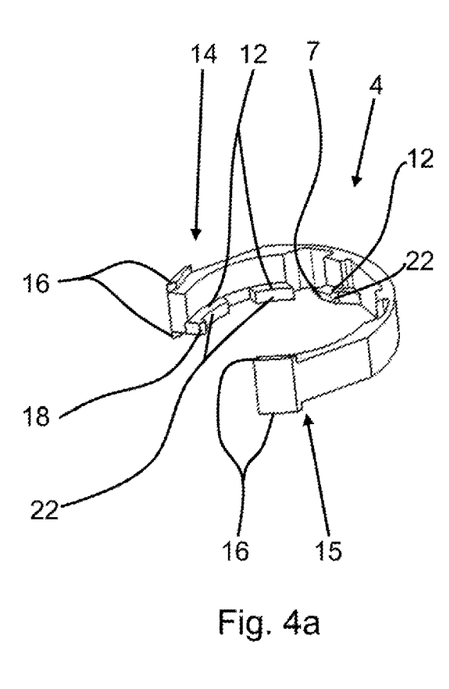
FIGS. 4*a*, 4*b* and 4*c* an exemplary example of an attachment element presented in different views.
Figure 4B:
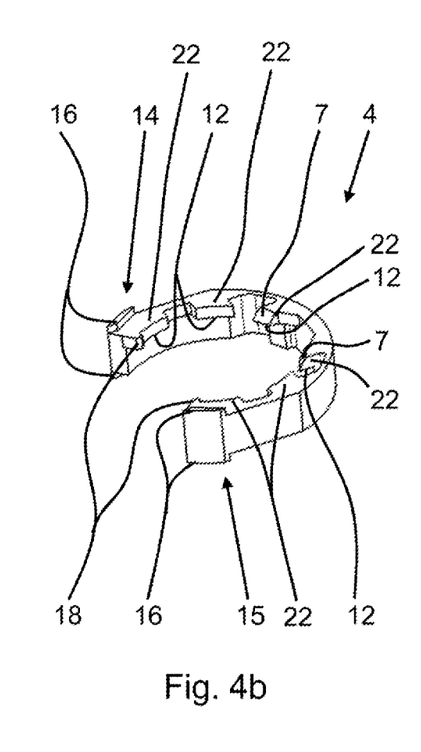
Figure 4C:
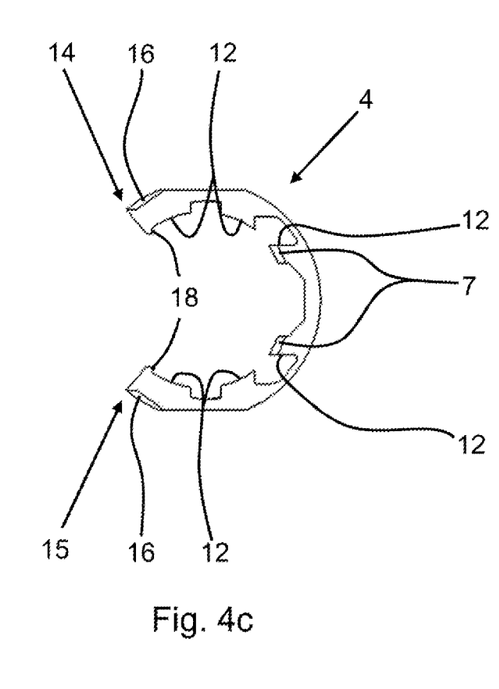

The insertion part 3 depicted as an example in FIG. 1 can be introduced into the connecting device 1 and secured to the coupling element 2 with the attachment element 4 depicted in FIGS. 4a to 4c. The insertion part 3 provides a connecting interface 8 for a media line, for example, a recess for a connecting plug (not illustrated).

Figure 2:
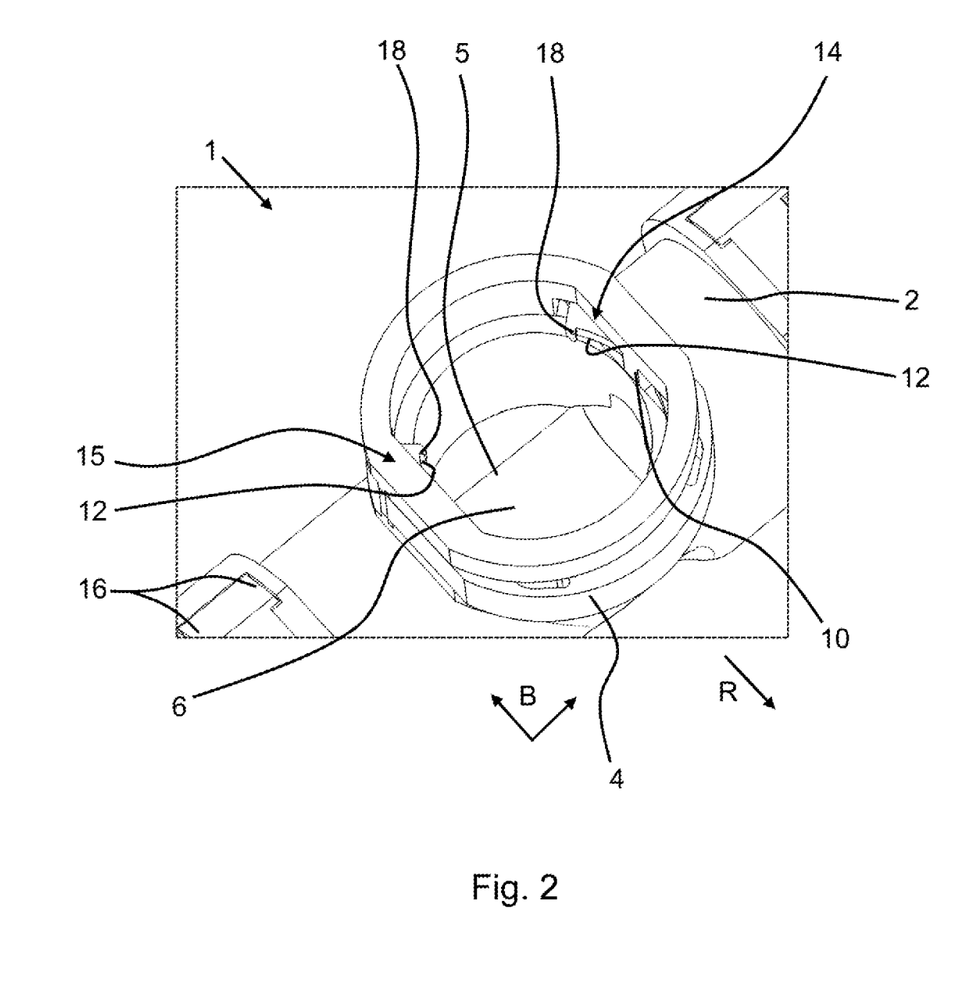
FIG. 2 provides a detailed view of an exemplary embodiment of a connecting device.
Figure 3:
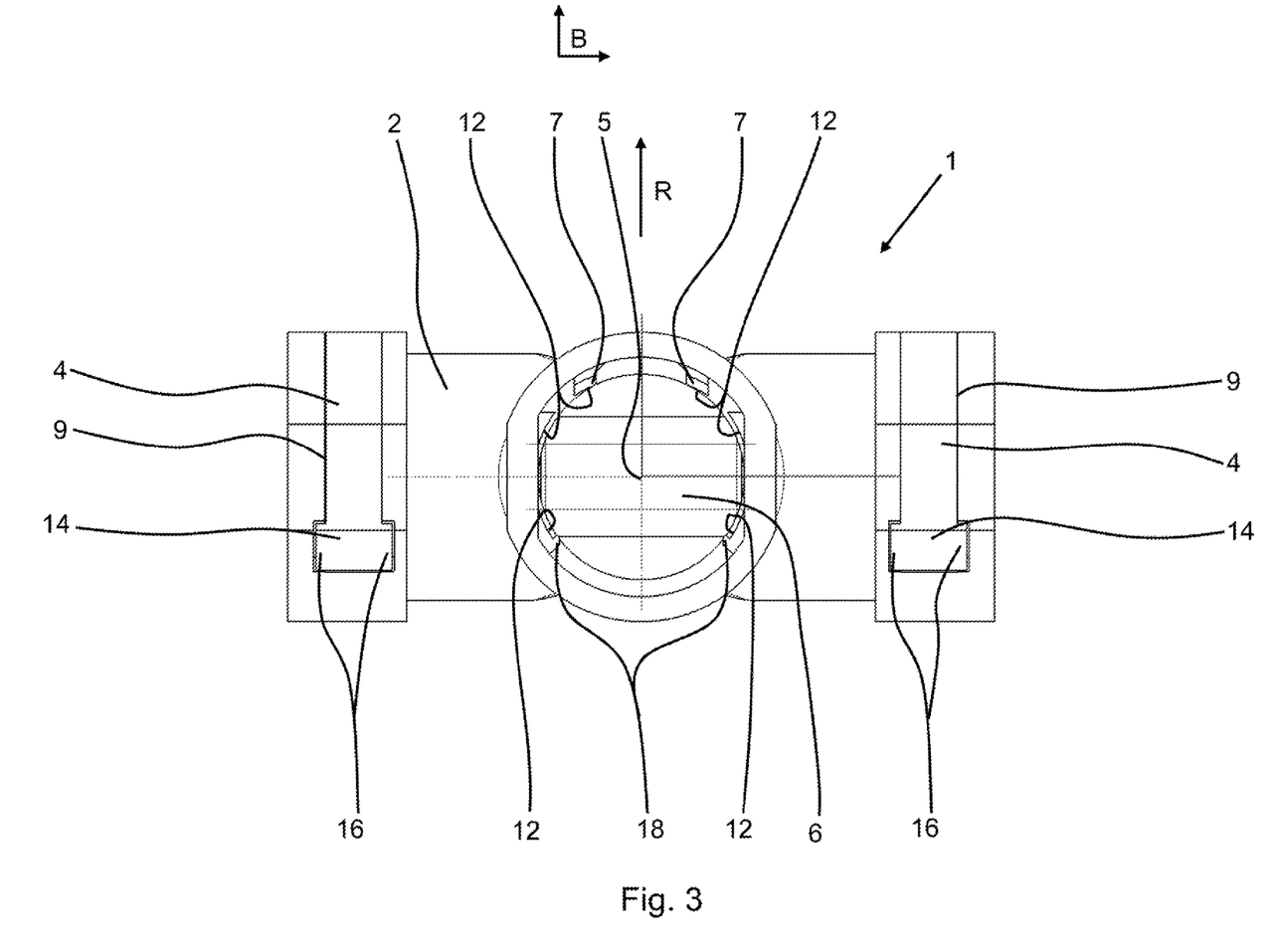
FIG. 3 depicts an exemplary embodiment of a connecting device, top view.
Figure 5:
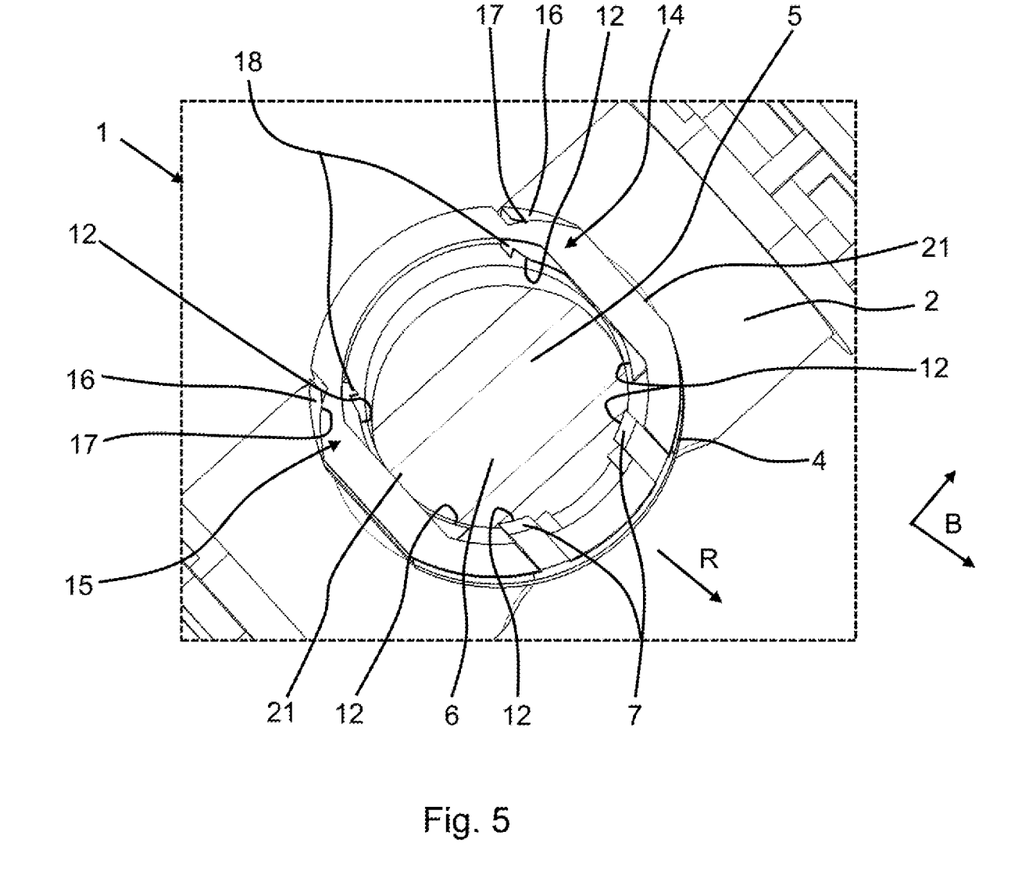
FIG. 5 provides a detailed view of an exemplary embodiment of a connecting device.
Figure 6:
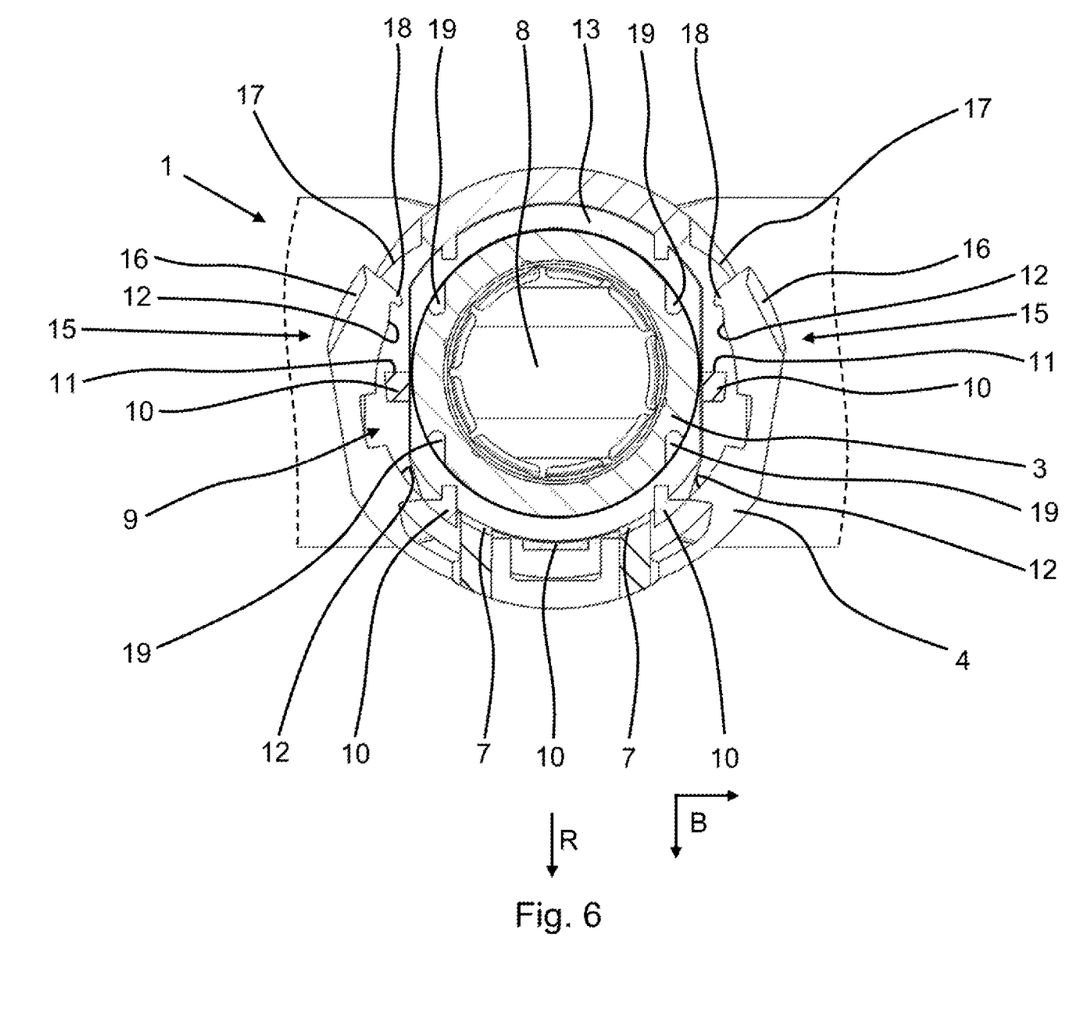
FIG. 6 an exemplary embodiment of a connecting device in partial cut-away view.

The attachment element 4 is held movably against the coupling element 2 between a starting position illustrated in FIG. 3 and FIG. 5, in which with the insertion part 3 installed, an interlocking of the insertion part 3 occurs, and an intermediate position illustrated in FIG. 2 and FIG. 6, in which the insertion part 3 can be introduced more deeply into the connection opening 5. According to FIGS. 4a to 4c, the attachment element 4 is designed as a separate component and is movably attached to the coupling element 2.

According to FIGS. 4a to 4c, the attachment element 4 features two control surfaces 7 arranged in the connection opening 5, which according to FIG. 3, FIG. 5 and FIG. 6, in the assembled state they cooperate with the coupling element 2 and with the insertion part 3.

If an insertion part 3 according to FIG. 1 is introduced into the connection opening 5 under the action of an assembly force M parallel to the middle axis A of the connection opening 5, then the insertion part 3 and/or the assembly force M acts upon the control surfaces 7 according to FIG. 3, FIG. 5 and FIG. 6, such that the attachment element 4 is moved from the starting position according to FIG. 3 and FIG. 5, into a notional plane of movement B in the direction of arrow R. Due to the movement of the attachment element 4 from the starting position relative to the middle axis A, the attachment element 4 is at least partly elastically deformed, so that a restoring force is generated that acts opposite to the movement.

Given a sufficient assembly force M, the insertion part 3 can slide past the control surfaces 7, so that no more force acts upon the control surfaces 7 and the attachment element 4 subsequently is moved back into its starting position under the action of the restoring force, and can snap into the insertion part 3 in an interlocking manner. If the assembly force M is not sufficient, then under the effect of the restoring force, the insertion part 3 is again pressed through the control surfaces 7 of the attachment element 4, at least partly out from the connection opening 5 opposite the assembly direction. This will ensure that any improper assembly is noticed immediately.

According to FIG. 2, FIG. 5 and FIG. 6, the attachment element 4 is guided in a recess 9 on the coupling element 2. There are five webs 10 arranged in the recess 9, which bridge the recess 9 in a stabilizing manner, and under a pressure load prevent any opening of the recess 9 in a direction parallel to the middle axis A of the connection opening 5. According to FIG. 6, the movement of the attachment element 4 can be limited in direction R with the side surfaces 11 of the webs 10 which are arranged in the edge region.

According to FIG. 2, FIG. 3, FIG. 4a, FIG. 4b, FIG. 4c, FIG. 5, FIG. 6, FIG. 8a and FIG. 8b the attachment element 4 features six snap-in surfaces 12, which in the starting position according to FIG. 3 and FIG. 5, engage through the recess 9 and cooperate in an interlocking manner with the insertion part 3, in particular in a direction parallel to the middle axis A of the connection opening 5, provided an insertion part 3 has been introduced to a sufficient depth into the connection opening 5. The snap-in surfaces 12 according to FIG. 1, FIG. 6, FIG. 9 and FIG. 10 cooperate with an attachment collar 13 on the insertion part 3, in that they overlap the top side of the attachment collar 13. The snap-in surfaces 12 and the control surfaces 7 are each provided on a total of six lugs 22 on the attachment element 4. The lugs 22 extend in the assembled state essentially radially in the direction of the middle axis A of the connection opening 5.

According to FIG. 3, FIG. 5 and FIG. 6, the attachment element 4 engages around the coupling element 2 and—provided it is present—the insertion part 3, at least in part, so that a first end region 14 and a second end region 15—see also FIG. 4a to FIG. 4c—are arranged oppositely, in particular with reference to the middle axis A.

According to FIG. 4c, FIG. 6, FIG. 8a and FIG. 8b, the attachment element 4 is designed with an essentially C-shaped cross section (top view). According to FIG. 4a to FIG. 4c, FIG. 5, FIG. 6, FIG. 8a and FIG. 8b, in the first end region 14 and in the second end region 15 there are two guide lugs 16 each, which extend upward and downward in a direction parallel to the middle axis A of the connection opening 5. Given a movement of the attachment element 4 from the starting position in direction R, in particular in the direction of the intermediate position, the guide lugs 16 slide along corresponding guide surfaces 17 outward at the coupling element 2, so that the first end region 14 and the second end region 15 will be spread apart and the restoring force will be generated which counteracts the movement of the attachment element 4 in direction R, thus, opposite to the direction R.

The guide surfaces 17 are also illustrated, for example, in FIG. 1 and FIG. 6. The guide surfaces 17 are oriented essentially tangential to a notional circle around the middle axis A and the connection opening 5, see in particular FIG. 5 and FIG. 6, wherein the degree of deformation, in particular the spreading of the attachment element 4 and thus the restoring force is adjustable by means of a design change to the slope of the guide surfaces 17. The invention also provides that the guide surfaces 17 are at least partly bulged.

In particular to additionally secure the insertion part 3 in the connection opening 5, the attachment element 4 according to FIG. 2, FIG. 3, FIG. 4a to FIG. 4c, FIG. 5, FIG. 6, FIG. 8a and FIG. 8b features in its first end region 14 and in its second end region 15 one snap-in protrusion 18 each, which in the assembled state each engage in provided snap-in setbacks 19 on the insertion part 3—see for example, FIG. 6. Due to the interlocking engaging of the snap-in protrusions 18 into the snap-in setbacks 19, the insertion part 3 is additionally secured in the connection opening 5. Because the first end region 14 and the second end region 15 are spread apart under a movement of the attachment element 4 from the starting position due to the cooperation of the guide lugs 16 and the guide surfaces 17—see for example FIG. 5 and FIG. 6—the snap-in protrusions 18 are moved essentially in a radial direction to and from the middle axis A of the connection opening 5. According to the exemplary embodiment depicted in FIG. 8a and FIG. 8b, the snap-in protrusions 18 are formed on the guide lugs 16.

According to FIG. 1, the insertion part 3 features a flat section 20 on each of two opposing sides, which are designed to correspond to flat sections 21 on the interior perimeter of the connection opening 5—see for example FIG. 1, FIG. 2, FIG. 3 and FIG. 5. Thus the insertion part 3 can be brought into the connection opening 5 in two alignments mutually offset at 180°.

Figure 7:
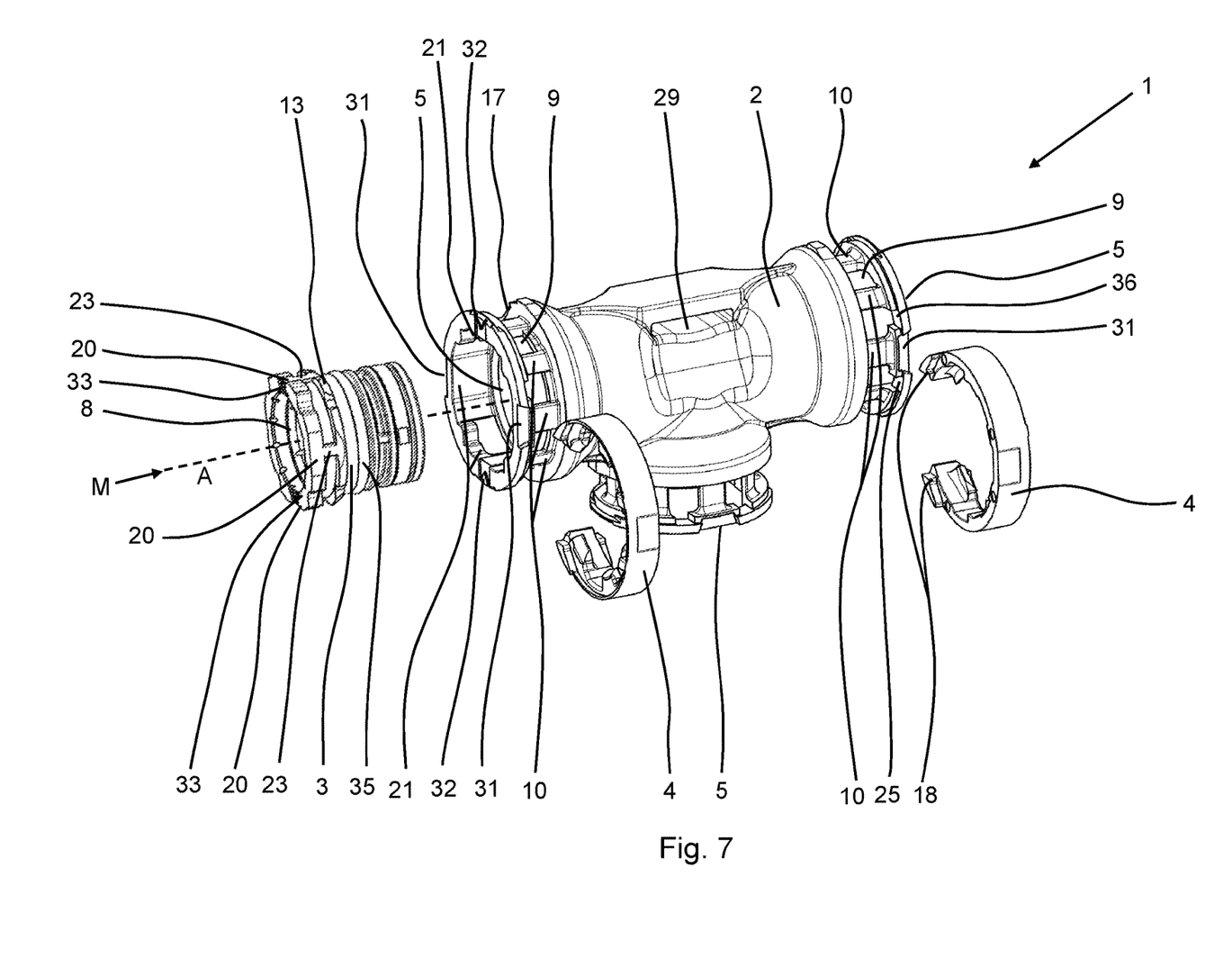
FIG. 7 an exemplary embodiment of a connecting device, perspective view.

FIG. 7 shows an exemplary embodiment of a connecting device 1 in perspective view. The connecting device 1 features at least one coupling element 2, which in this exemplary embodiment is designed as a T-connector with three connection openings 5. The connecting device 1 furthermore features at least one insertion part 3, and also two attachment elements 4 depicted in FIG. 7, for example, in the not assembled state. A corresponding attachment element 4 is likewise illustrated separately in FIG. 8a and FIG. 8b and will be described in greater detail in this regard.

Figure 8A:
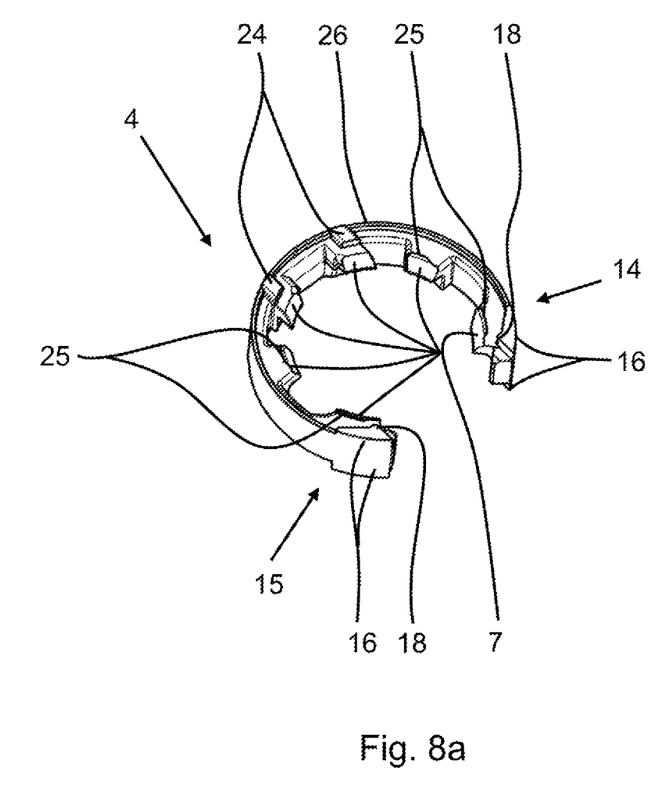
FIG. 8*a* and FIG. 8*b* an exemplary example of an attachment element presented in different views.
Figure 8B:
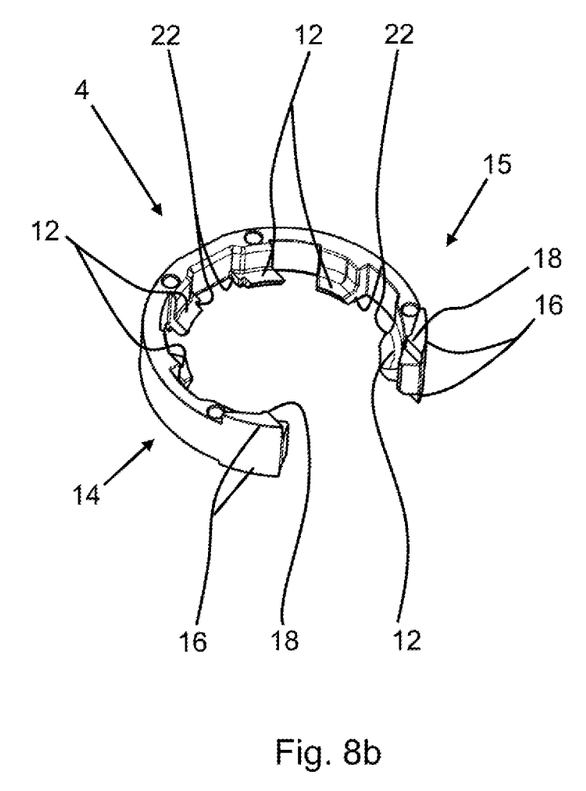

The insertion part 3 depicted as an example in FIG. 7 can be introduced into the connecting device 1 and secured to the coupling element 2 with the attachment element 4 depicted in FIG. 8a and FIG. 8b. The insertion part 3 provides a connecting interface 8 for a media line, for example, a recess for a connecting plug (not illustrated). In this exemplary embodiment the connection openings 5 feature four flat sections 21 which cooperate with corresponding flat sections 20 on the insertion part 3 and hold the insertion part 3 in the assembled state in a non-tip and rotation-locked manner in the connection opening 5.

The attachment elements 4 according to FIG. 7—as already described for FIG. 3 and FIG. 5—are movably held in the assembled state in order to cooperate with the insertion part 3. The snap-in surfaces 12 of the attachment elements 4 cooperate in an interlocking manner with an attachment collar 13 on the insertion part 3. For reasons of control and stabilization, four webs 23 are distributed across the perimeter of the attachment collars. The webs 23 are arranged in the region of the flat sections 20.

The attachment element 4 means according to the exemplary embodiment of FIG. 8a and FIG. 8b overall features six lugs 22 each having on one side a control surface 7, and on the other side a snap-in surface 12. According to FIG. 8a, the attachment element 4 features two guide protrusions 24 which act to guide the movement of the attachment element 4 relative to the coupling element 2 and guide it into corresponding guide recesses 36—according to FIG. 7—on the coupling element 2.

In the exemplary embodiment of FIG. 8a and FIG. 8b, the attachment element 4 features a total of four blocking edges 25 which are arranged in the regions of the attachment element 4 and which spring outward during a movement from the starting position. The blocking edges 25 in particular are designed to rest against the particular control surfaces 7. The function of the blocking edges 25 will be explained in FIG. 10.

The attachment element 4 according to FIG. 8a features a guard edge 26 which extends between the two guide lugs 16. The guard edge 26 in the assembled state prevents the penetration of contamination or paint into the gap between attachment element 4 and coupling element 2, and thus ensures the movability of the attachment element 4.

Figure 9:
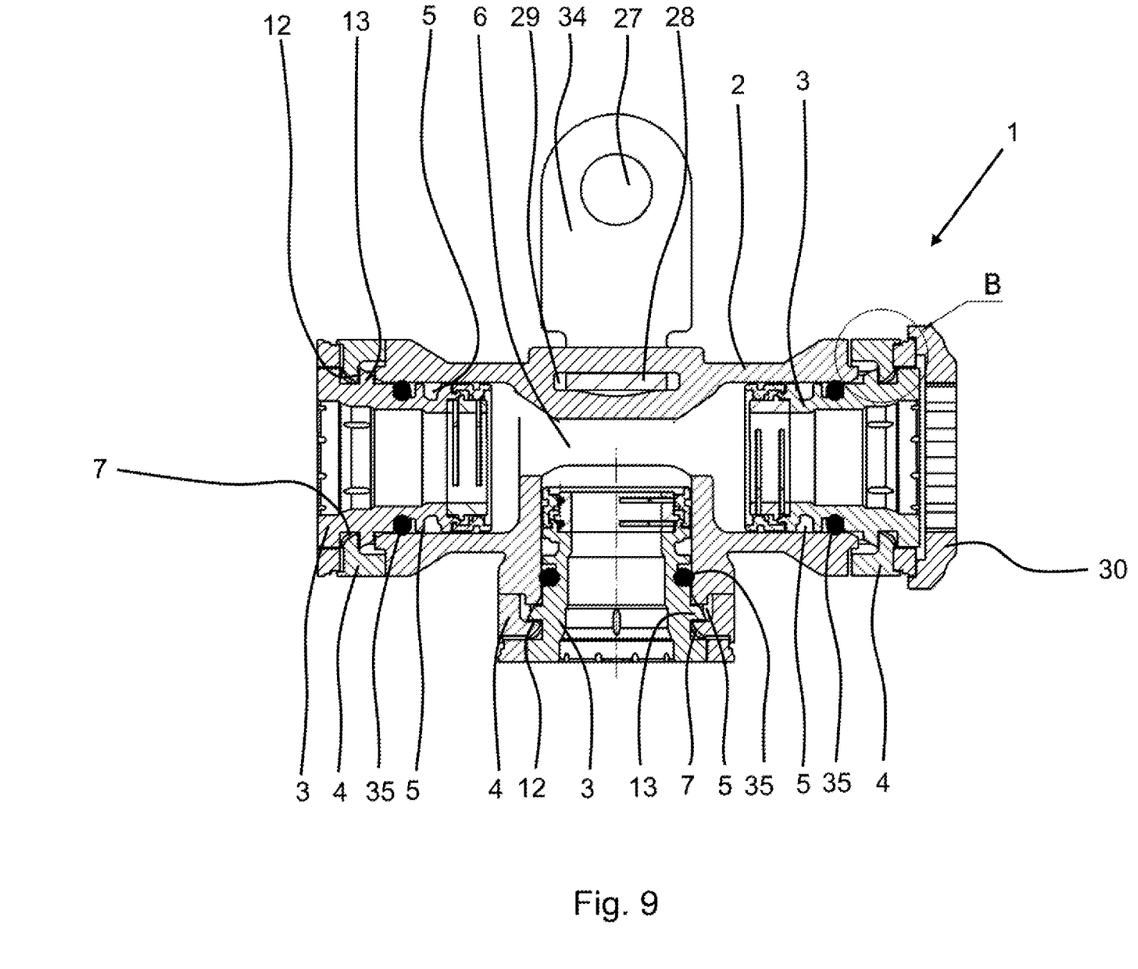
FIG. 9 an exemplary embodiment of a connecting device in cut-away view.

FIG. 9 shows one exemplary embodiment of a coupling element 2 according to FIG. 7 with three assembled insertion parts 3 in the three connection openings 5. The coupling element 2 features a retaining element 34 which is designed as an angular metal piece and features an assembly opening 27. The retaining element 34 is inserted by one leg 28 into a recess 29 on the coupling element 2 and acts for fastening of the coupling element 2. The insertion parts 3 are held by the attachment elements 4 located in their particular starting positions. The snap-in surfaces 12 thereby cooperate with the attachment collars 13 of the particular insertion part 3 in an interlocking manner. The insertion parts 3 according to FIG. 9 each feature a single gasket 35 which in the assembled state rests against and seals the connection opening 5.

Figure 10:
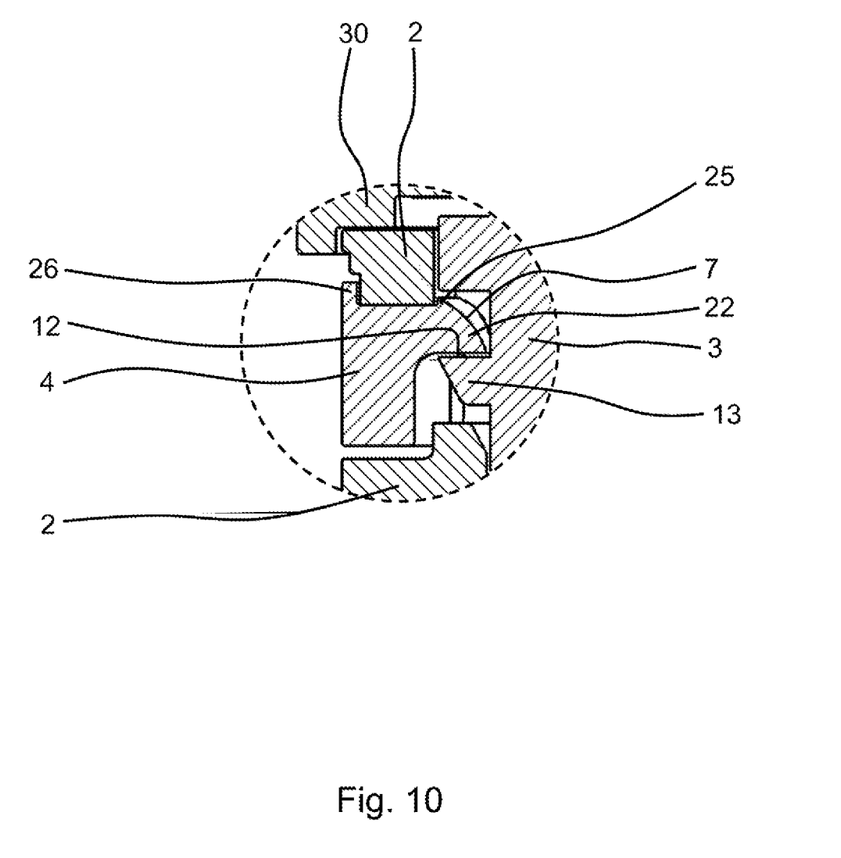
FIG. 10 an enlargement of section B in FIG. 9.

FIG. 10 presents an enlargement of region B according to FIG. 9. The insertion part 3 is held in the connection opening 5 of the coupling element 2 by means of the cooperation of attachment collars 13 and snap-in surfaces 12 of the attachment element 4. In the operating state the insertion part 3 is pressed—upward according to FIG. 10—by the applied pressure in the direction from the connection opening 5. The attachment element 4 acts against this. Thus the blocking edge 25 of the attachment element 4 is pressed to engage with the coupling element. Thus the blocking edge 25 prevents the attachment element 4 from escaping to the side—to the left in FIG. 10—so that the operating reliability is improved. The blocking edges 25 prevent an unintentional spreading of the attachment element 4. Furthermore, the guard edge 26 is formed on the outside and prevents the penetration of contamination between the attachment element 4 and the coupling element 2. Due to the presence of the guard edge 26 it is assured that the blocking edge 25 can act on the inside, since the attachment element 4 can rest against the coupling element 2 without interference from foreign objects and the blocking edge 25 will thus achieve its blocking effect.

According to FIG. 9 and FIG. 10, in the region of the connection opening 5 a rotation lock 30 is provided which allows a rotational alignment and locking of a connecting plug (not illustrated). The rotation lock 30 snaps into the coupling element 2 in an interlocking manner. In addition, the rotation lock 30 cooperates with setbacks 31 on the coupling element 2 in order to transfer a torque around the middle axis A.

According to FIG. 7, in the edge region of the connection opening 5 there are two alignment indicators 32 positioned oppositely along the perimeter. One insertion part is then aligned for introducing into the connection opening 5 when the alignment indicators 32 of the coupling element 2 align with corresponding alignment indicators 33 on the insertion part 3.

The coupling element 2 according to FIG. 1, FIG. 3, FIG. 7 and FIG. 9 is designed here, for instance, as essentially a T-shaped connecting piece with three connection openings 5 for insertion of three insertion parts 3. Different configurations, for example straight or L-shaped connecting pieces, are likewise possible. Furthermore, an embodiment of the coupling element as a plate-shaped connector is possible, in particular according to the disclosure of DE 10 2017 106 676, which is expressly referenced herewith.

The invention is not limited to the illustrated and described embodiments, but rather encompasses also all designs which are equivalent within the sense of the invention. It is expressly emphasized that the exemplary embodiments are not limited to all features in combination, rather, each individual part feature can by itself also have inventive significance even detached from all other part features. Furthermore, the invention is also not limited to a particular combination of features, but rather can also be defined by any other particular combination of particular features of all the disclosed individual features. This means that basically virtually each individual feature can be omitted and/or replaced by at least one individual feature disclosed elsewhere in the application.

The invention claimed is:

1. A connecting device for media lines, with at least one coupling element, at least one insertion part and at least one attachment element, wherein the coupling element features at least one connection opening and at least one fluid channel, wherein the insertion part can be inserted at least partly into the connection opening, and wherein the insertion part with the attachment element can be secured to the coupling element, wherein the attachment element is movably held against the coupling element, that the attachment element features at least two control surfaces, that upon insertion of the insertion part into the connection opening under the effect of an assembly force, the insertion part acts upon the control surfaces such that the attachment element is moved from a starting position opposite a restoring force, that the restoring force is effected by an at least partial elastic deformation of the attachment element, and that with sufficient assembly force, the insertion part slides past the control surfaces so that the attachment element is moved back into the starting position due to the effect of the restoring force and snaps in an interlocking manner with the insertion part, or that when the assembly force is not sufficient, the attachment element is moved under the effect of the restoring force back into the initial position and the insertion part is pressed at least partly out from the connection opening by means of the control surfaces, wherein the insertion part provides a connecting interface for a media line, wherein the attachment element is guided in at least one recess against the coupling element, the recess includes at least one web and that the web overlaps and stabilizes the recess, wherein the attachment element includes at least four snap-in surfaces, which in the snapped-in assembly state cooperate in an interlocking manner with the insertion part, wherein the attachment element features a plurality of lugs, wherein at least one snap-in surface is formed on each lug.

2. The connecting device (1) according to claim 1, wherein the control surfaces have an inclination of between 30° and 50° to a plane of motion of the attachment element.

3. The connecting device according to claim 1, wherein the recess includes between two and five webs.

4. The connecting device according to claim 1, wherein the attachment element includes at least six snap-in surfaces, which in the snapped-in assembly state cooperate in an interlocking manner with the insertion part.

5. The connecting device according to claim 4, wherein at least one control surface is formed on the lug.

6. The connecting device according to claim 4, wherein at least one control surface is formed adjoining the snap-in surface.

7. The connecting device according to claim 1, wherein the attachment element at least partly overlaps the coupling element so that a first end region and a second end region of the attachment element are disposed opposite each other.

8. The connecting device according to claim 7, wherein in the first end region and/or in the second end region of the attachment element, at least one guide lug is formed, and that after a movement from the starting position along at least one corresponding guide surface, the guide lug slides along the coupling element, in particular so as to deform elastically the attachment element.

9. The connecting device according to claim 8, wherein the guide surfaces cooperating with the first end region and with the second end region are inclined oppositely to each other.

10. The connecting device according to claim 8, wherein the restoring force is adjusted by means of the selection of the material of the attachment element and/or by the alignment of the guide lugs and the guide surfaces.

11. The connecting device according to claim 8, wherein the guide lug slides along the coupling element so as to deform elastically the attachment element.

12. The connecting device according to claim 7, wherein the attachment element features at least one snap-in protrusion and that the snap-in protrusion in the assembled state engages in a snap-in setback at the insertion part.

13. The connecting device according to claim 1, wherein the insertion part includes at least one flat section and that the connection opening features at least one corresponding flat section at the inner perimeter.

14. The connecting device according to claim 1, wherein the attachment element includes at least one blocking edge, and that the blocking edge in the assembled state cooperates in an interlocking manner with the coupling element.

15. The connecting device according to claim 1, wherein the attachment element produces a snap-in noise upon reaching the starting position.

16. The connecting device according to claim 1, wherein the attachment element includes on at least one side, at least one circumferential guard edge.

17. The connecting device according to claim 1, wherein the coupling element includes at least one alignment indicator for the insertion part.

18. The connecting device according to claim 1, further comprising at least one rotation lock, configured to snap into the coupling element in an interlocking manner.

19. The connecting device according to claim 1, wherein at least one web limits the movement of the attachment element.

20. The connecting device according to claim 1, wherein the snap-in surfaces interact with an attachment collar on the insertion part.

* * * * *